United States Patent
Engelmann

(10) Patent No.: US 10,776,638 B2
(45) Date of Patent: Sep. 15, 2020

(54) COLD PLANER ROTOR COLLISION AVOIDANCE

(71) Applicant: Caterpillar Paving Products Inc., Brooklyn Park, MN (US)

(72) Inventor: Eric S. Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/223,399

(22) Filed: Dec. 18, 2018

(65) Prior Publication Data

US 2020/0193179 A1    Jun. 18, 2020

(51) Int. Cl.
| | |
|---|---|
| *B60Q 1/00* | (2006.01) |
| *G06K 9/00* | (2006.01) |
| *G01P 13/04* | (2006.01) |
| *E01C 23/12* | (2006.01) |
| *E01C 23/088* | (2006.01) |

(52) U.S. Cl.
CPC ........ *G06K 9/00805* (2013.01); *E01C 23/088* (2013.01); *E01C 23/127* (2013.01); *G01P 13/04* (2013.01)

(58) Field of Classification Search
CPC . G06K 9/00805; E01C 23/088; E01C 23/127; G01P 13/04; G01S 13/931; G01S 13/88; G01S 13/885; E02F 9/245; E02F 9/262; E02F 9/264; E02F 3/18; B60Y 2200/41; G05D 1/021
USPC ......... 340/435, 436, 679, 680, 686.1, 686.6; 404/72, 84.1, 90
See application file for complete search history.

(56) References Cited

U.S. PATENT DOCUMENTS

| | | | |
|---|---|---|---|
| 5,879,056 A | 3/1999 | Breidenbach | |
| 7,530,641 B2 | 5/2009 | Berning et al. | |
| 8,794,869 B2 | 8/2014 | Schlenker et al. | |
| 2012/0191300 A1* | 7/2012 | Mayo | G01S 17/87 701/41 |
| 2013/0249271 A1* | 9/2013 | Killion | E01C 23/088 299/1.5 |
| 2014/0348584 A1* | 11/2014 | Fritz | G05D 1/0214 404/72 |
| 2016/0265174 A1 | 9/2016 | Engelmann et al. | |
| 2016/0340842 A1* | 11/2016 | Adams | E01C 23/088 |
| 2019/0024328 A1* | 1/2019 | Stahl | E01C 23/01 |
| 2019/0101641 A1* | 4/2019 | Hogan | G01S 13/885 |
| 2019/0161924 A1* | 5/2019 | Gerhardy | E01C 23/088 |
| 2020/0114909 A1 | 4/2020 | Shelton et al. | |

* cited by examiner

*Primary Examiner* — Anh V La
(74) *Attorney, Agent, or Firm* — Oblon, McClelland, Maier & Neustadt

(57) ABSTRACT

An example cold planer system includes a machine frame, a milling rotor disposed in a milling chamber, a first sensor, a second sensor and a control module. The control module comprises a processor and a controller. The processor is configured to receive a first signal indicative of a direction of motion of the machine, and a second signal indicative of whether an object is present in an object detection zone. The processor processes the first signal and the second signal to generate a control signal. The controller is configured to receive the control signal from the processor and to initiate a rotor collision avoidance mode if an object is present in an object detection zone.

20 Claims, 8 Drawing Sheets

COLD PLANER ROTOR COLLISION AVOIDANCE

TECHNICAL FIELD

This document pertains generally, but not by way of limitation, to cold planers, and more particularly, to initiating a rotor collision avoidance mode during reverse propel, upon determination of certain conditions.

BACKGROUND

Asphalt-surfaced roadways are built to facilitate vehicular travel. Depending upon usage density, base conditions, temperature variation, moisture variation, and/or physical age, the surface of the roadways eventually become misshapen, non-planar, unable to support wheel loads, or otherwise unsuitable for vehicular traffic. In order to rehabilitate the roadways for continued vehicular use, spent asphalt is removed in preparation for resurfacing.

Cold planers, sometimes also referred to as road mills or scarifiers, are machines that typically include a frame propelled by tracked drive units. The frame supports an engine, an operator's station, and a milling rotor. The milling rotor, fitted with cutting tools, is rotated through a suitable interface by the engine to break up the surface of the roadway. The broken-up roadway material is deposited by the milling rotor onto a conveyor, or series of conveyors, that transport the material away from the machine and to a nearby haul vehicle for transportation away from the jobsite.

Control modules are provided in machines such as cold planers to operate the milling rotor and to control certain mechanisms associated with the machine. For example, the control module can control moving the milling rotor to a raised position when not in the milling mode, such as when the cold planer is moving in a direction reverse to the working (e.g., milling) direction.

Milling machines, such as cold planers can operate by making several parallel passes. It can be preferable to leave the milling rotor rotating when moving in reverse to prepare for the next pass because shutting down the milling rotor and starting it back up takes time and can cause wear and decreased life on the driveline. However, if the rotating milling rotor comes into contact with an object while the machine is moving in reverse, kickback created by the collision between the object and the rotating milling rotor can damage the machine and/or the object.

One attempt to address this issue is described in U.S. Pat. No. 7,530,641 to Berning et al., and issued on May 12, 2009. The '641 patent describes a construction machine that monitors the distance between a milling drum and a ground surface and uncouples the raised milling drum from a drive engine, or uncouples traveling devices from the drive engine, or raises the machine frame or generates an alarm signal when the monitoring device detects a deviation that falls below a pre-determined distance.

Although the '641 patent provides a way of preventing kickback created by the collision of the rotor with an object, the design may also have drawbacks because it is limited to detecting a distance between a milling drum and a ground surface to prevent kickback.

Another attempt to address this issue is described in U.S. Patent Application Publication 2016/0265174 to Engelmann et al, and published on Sep. 15, 2016. The '174 publication describes a control system having obstacle detection and mapping. The control system may include an obstacle detection sensor mountable to the cold planar at a location forward of the milling drum and also a locating device. The control system can use signals from the obstacle detection sensor and the locating device to generate an electronic map of a work area and to selectively adjust operation of the cold planer based on the electronic map.

Although the '174 publication includes obstacle detection, the control system in the '174 publication is limited to mapping the work area and does not sense or map in a manner that can prevent kickback.

The present disclosure is directed toward on or more of the problems set forth.

SUMMARY

Illustrative cold planer systems and methods including sensor(s) to determine situations that warrant a control module initiating a rotor collision avoidance mode, are described herein.

Milling machines, such as cold planers can operate by making several parallel passes. It can be preferable to leave the milling rotor rotating when moving in reverse to prepare for the next pass because shutting down the milling rotor and starting it back up takes time and can cause wear and decreased life on the driveline. However, if the rotating milling rotor comes into contact with an object while the machine is moving in reverse, kickback created by the collision between the object and the rotating milling rotor can damage the machine and/or the object.

In an example machine, the machine includes a machine frame, a power source, a milling rotor, a milling chamber, a first sensor, a second sensor and a control module. The milling rotor is operatively connected to the power source and the machine frame. The milling chamber is coupled to the machine frame and encloses the milling rotor (e.g., the milling rotor is disposed in the milling chamber with the chamber open to the ground). The first sensor is configured to detect a direction of motion of the machine and to generate a first signal. The second sensor is configured to determine if an object is within an object detection zone and to generate a second signal. The object detection zone is located outside of the milling chamber. The control module includes a processor and a controller. The processor is configured to receive and process the first signal and the second signal, and to generate a control signal based on the first and second signal. The controller is configured to receive the control signal from the processor and to initiate a rotor collision avoidance mode based on the control signal.

In an example control module for a milling machine, the control module includes a processor and a controller. The processor is configured to receive a first signal indicative of a direction of motion of the machine and a second signal indicative of a presence of an object within an object detection zone. The object detection zone is located outside of a milling chamber that encloses a milling rotor. The processor processes the first signal and the second signal to generate a control signal based on the first signal and the second signal. The controller is configured to receive the control signal from the processor and to initiate a rotor collision avoidance mode based on the control signal.

In an example method of controlling a machine, the method includes detecting, with a first sensor, a direction of motion of the machine. The method includes generating a first signal based on the direction of motion of the machine. In addition to the first sensor detecting and generating, the method further includes determining, using a second sensor, if an object is in an object detection zone and generating a second signal indicative of a presence or absence of an object in the object detection zone. The method includes processing, with a processor, the first and second signals, and generating a control signal based on the first and second signals. Based on the generated control signal, the method can include initiating a rotor collision avoidance mode, with the control module.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

A cold planer may be defined as a machine used to remove layers of hardened asphalt from an existing roadway. It is contemplated that the disclosed cold planer may also or alternatively be used to remove cement and other roadway surfaces. Although the type of machine illustrated in the examples is a cold planer, the machine may be any other type that includes a milling rotor. The cold planer is shown primarily for illustrative purposes to disclose features of various examples.

In this disclosure, relative terms, such as, "rearward" or "forward" may be described with respect to the milling machine traveling in a working direction being the forward direction. In addition, the terms "rearward" or "forward may be described with respect to the milling rotor. For example, rearward of the milling rotor can be defined as rearward of the milling rotor when the cold planer is traveling in a working (e.g., forward) direction.

In this disclosure, relative terms, such as, "substantially" are used to indicate a possible variation, for example, of ±10% in a stated numeric value.

Figure 1:
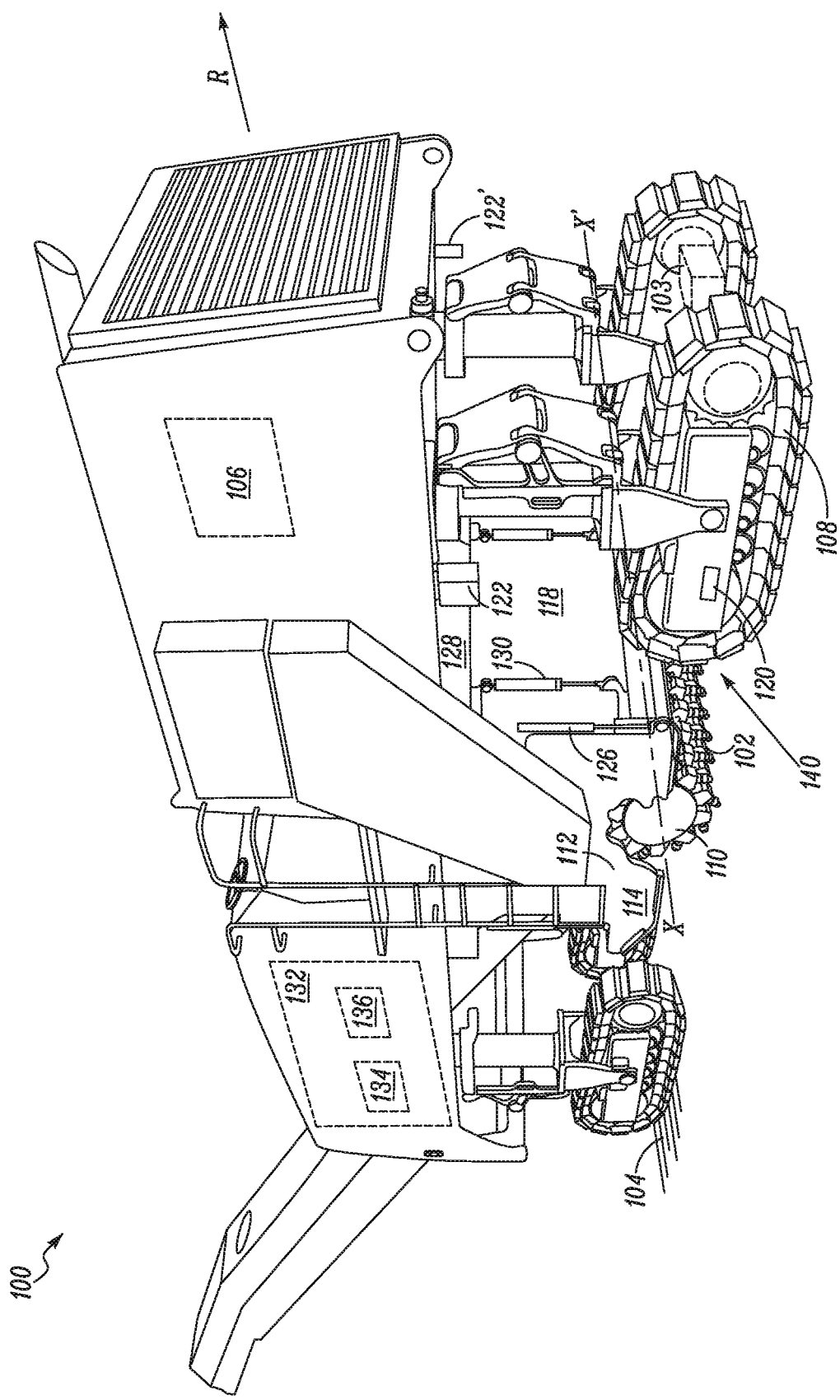
FIG. 1 is a perspective view of a machine in accordance with at least one example.
Figure 2:
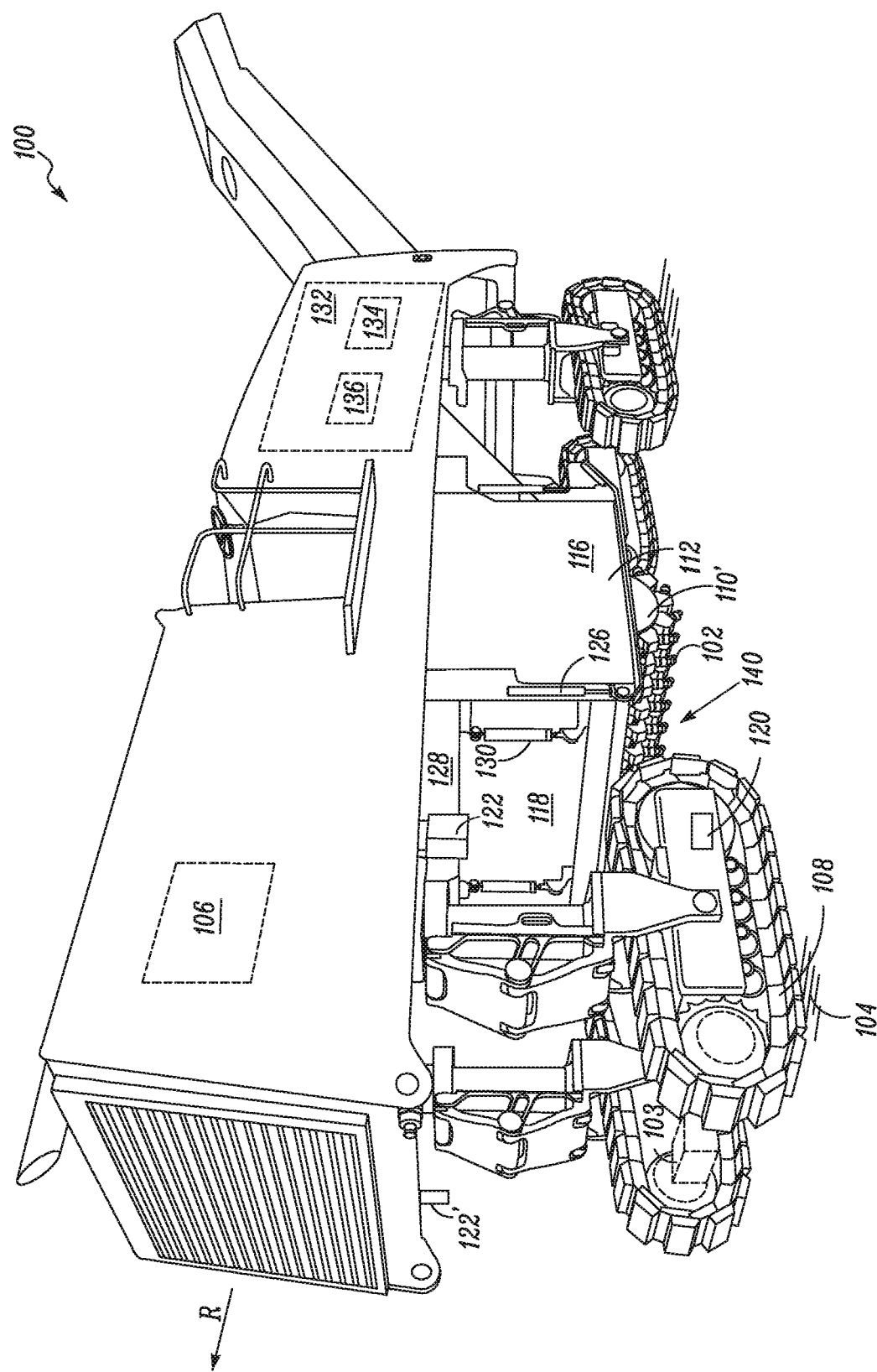
FIG. 2 is another perspective view of the machine of FIG. 1.

The present disclosure relates to a control system for a milling rotor of a machine 100. FIGS. 1-2 show views of an illustrative machine 100 in which examples described herein may be implemented. The machine 100 may be a wheeled or tracked industrial vehicle, including but not limited to, cold planers, paver machines, tracked vehicles for road compaction, milling, or the like. As shown in FIGS. 1-2, the machine 100 may embody a cold planer which may be used for milling soil or asphalt off the ground 104. The machine 100 can include a frame 128 and a power source 106. The power source 106 can be a prime mover such as an engine or an electric motor that delivers power to the machine 100. The power source 106 powers a traveling system 108 via a propel system 103. The propel system 103 transfers mechanical or electrical power to control the motion of the traveling system 108. In an example, as shown in FIGS. 1-2, the traveling system 108 can include tracks.

The machine 100 further includes a milling rotor 102 operatively connected to the power source 106. During operation, the power source 106 drives the milling rotor 102 (hereinafter, rotor) to mill soil or asphalt off the ground 104. To protect milled material from being dispersed by the rotor, the machine 100 can include a milling chamber 112. The rotor 102 can be disposed in the milling chamber 112.

In an example, the milling chamber 112 includes a pair of side plates 114, 116 to substantially cover end faces 110, 110' of the rotor 102. As shown in FIG. 1 a first side plate 114 is disposed adjacent to a first end face 110 of the rotor 102. Further, as shown in FIG. 2, a second side plate 116 is disposed adjacent to a second end face 110' of the rotor 102. The machine 100 further includes a moldboard 118 disposed vertically and substantially parallel to the longitudinal axis X-X' of the rotor 102 as shown in FIG. 1.

In some examples, the milling chamber 112, the frame 128 and the rotor 102 all move together by telescoping legs on the machine. The first and second hydraulic cylinders 126, 130 can move the sideplates 114, 116 and the moldboard 118 up and down relative to the rotor 102. In other words, the entire machine 100 can move as one unit and that movement controls the milling depth of the rotor 102.

The machine 100 includes a first sensor 120 and a second sensor 122 (e.g., one or more first sensors, one or more second sensors). The first sensor 120 can be configured to detect the direction of motion of the machine 100 and generate a first signal S1. In an example, the first sensor 120 can be connected to the traveling system 108 of the machine 100. The first sensor 120 can detect the direction of motion of the machine 100 by any suitable method. The direction of motion can be determined by detecting, for example, a direction of rotation of the traveling system 108, by an input to an operator joystick of the machine 100, by a displacement of the machine 100, other suitable inputs, or a combination thereof.

In addition to the first sensor 120 detecting the direction of motion of the machine 100, the second sensor 122 can be configured to determine the presence or absence of an object in an object detection zone 140 and generate a second signal S2. In some examples, suitable second sensors include, but are not limited to, smart cameras, laser scanners and LIDAR.

The object detection zone 140 can be located outside of the milling chamber 112. Such as rearward or forward of the milling chamber 112. In some examples, and as shown in FIGS. 1 and 2, the object detection zone 140 is located rearward of the milling chamber 112. As described herein the directions "forward" and "rearward" are described with respect to the rotor 102. For example, forward is defined as the direction forward of the rotor 102 when the machine is traveling in a forward direction (e.g., forward, milling direction). Opposite of the forward direction, the rearward direction is defined as the direction rearward of the rotor 102 when the machine is traveling in a forward direction (e.g., milling direction, working direction)

The second sensor(s) 122 can be located in any suitable location to sense an object detection zone 140. In some examples, the object detection zone 140 corresponds to a zone that the rotor 102 may come into contact with when the machine 100 is traveling in a reverse direction.

As shown in FIGS. 1 and 2, in some examples the second sensor 122 can be mounted to the frame 128. In some examples the second sensor 122 can be mounted to the milling chamber 112, such as by attachment to the moldboard 118 (FIGS. 7 and 8), the traveling system 108 (FIG. 7), or any other suitable location for sensing the object detection zone 140.

Figure 3:
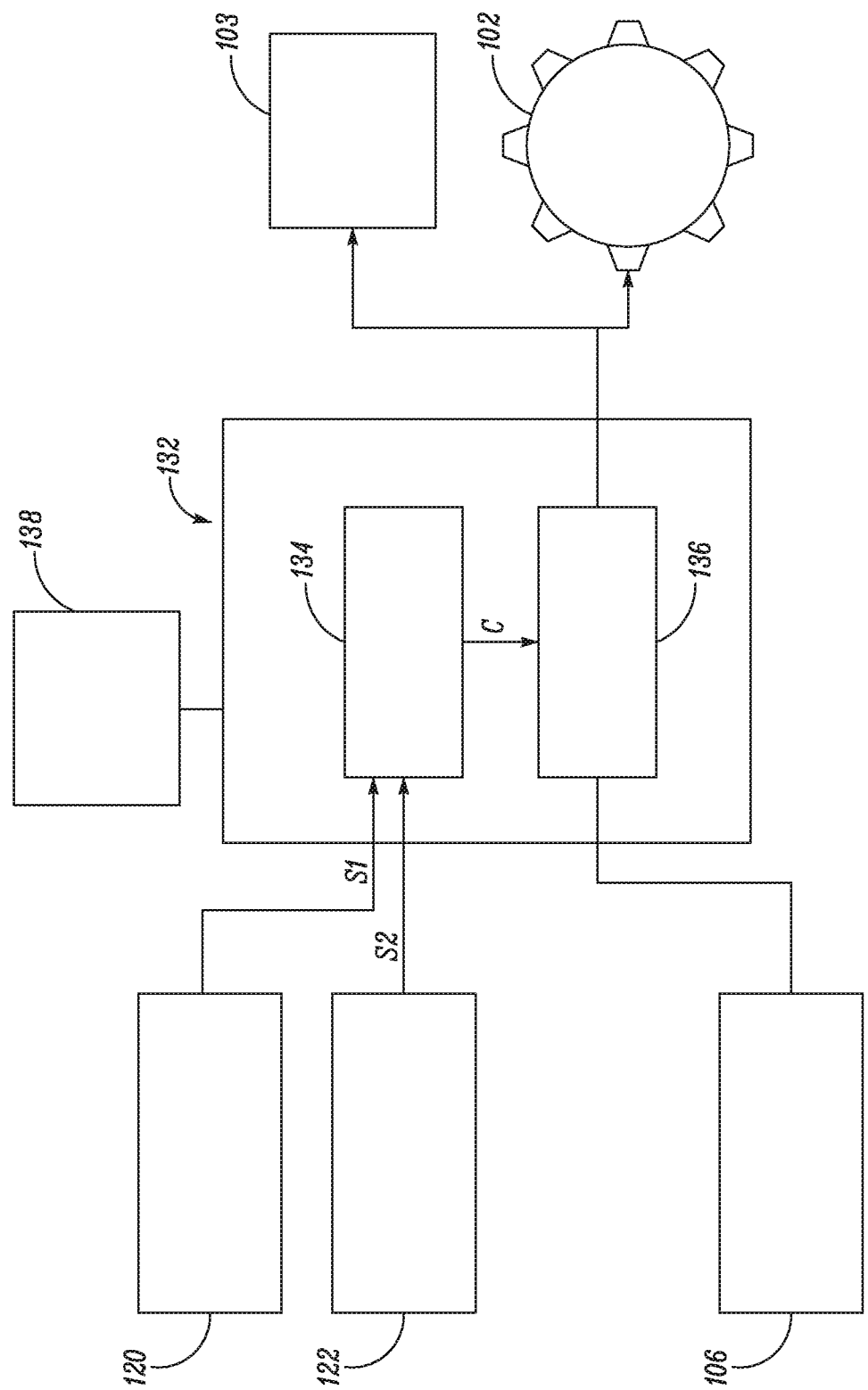
FIG. 3 is a schematic view of a control system in accordance with at least one example.

The machine 100 can include a control module 132 configured to perform a host of functions. FIG. 3 shows a schematic view of the control module 132 including a processor 134 and a controller 136. The processor 134 can be connected to the first sensor 120 and the second sensor 122. The processor 134 can be configured to receive a first signal S1 from the first sensor 120 and a second signal S2 from the second sensor 122. The processor 134, in one embodiment, processes the first signal S1 and the second signal S2 to generate a control signal C. It will be understood that processor 134 may not process the actual output signals S1 and S2 from sensors 120 and 122, but can perform its intended processing functions using representative signals, or data, of the state of output signals S1 and S2. The controller 136 can be connected to the power source 106, the processor 134, the rotor 102 and the propel system 103. The controller 136 can be configured to receive the control signal C from the processor 134 and initiate a rotor collision avoidance mode based on the control signal C. In some examples, the control signal C can cause the controller 136 to initiate the rotor collision avoidance mode when the first signal S1 is indicative of a reverse direction of motion of the machine 100 and the second signal S2 is indicative of an object being present in the object detection zone 140.

Initiating a rotor collision avoidance mode can include changing an operation status of the machine, for example, at least one of selectively disengaging the rotor 102, slowing a speed of the rotor 102, stopping a propel system 103 of the machine 100, slowing down the propel system 103 of the machine 100, raising at least a portion of the machine 100 (including, but not limited to the rotor 102), providing an alert, or providing alarm.

The processor 134 and the controller 136 can include one or more control modules, for example electronic control modules (ECMs), electronic control units (ECUs) and the like. The one or more control modules may include processing units, memory, second sensor interfaces, and/or control signal interfaces for receiving and transmitting signals. The processor 134 may represent one or more logic and/or processing components used by the control module 132 to perform certain communications, control, and/or diagnostic functions. For example, the processing components may be adapted to execute routing information among devices within and/or external to the control module 132.

Figure 4:
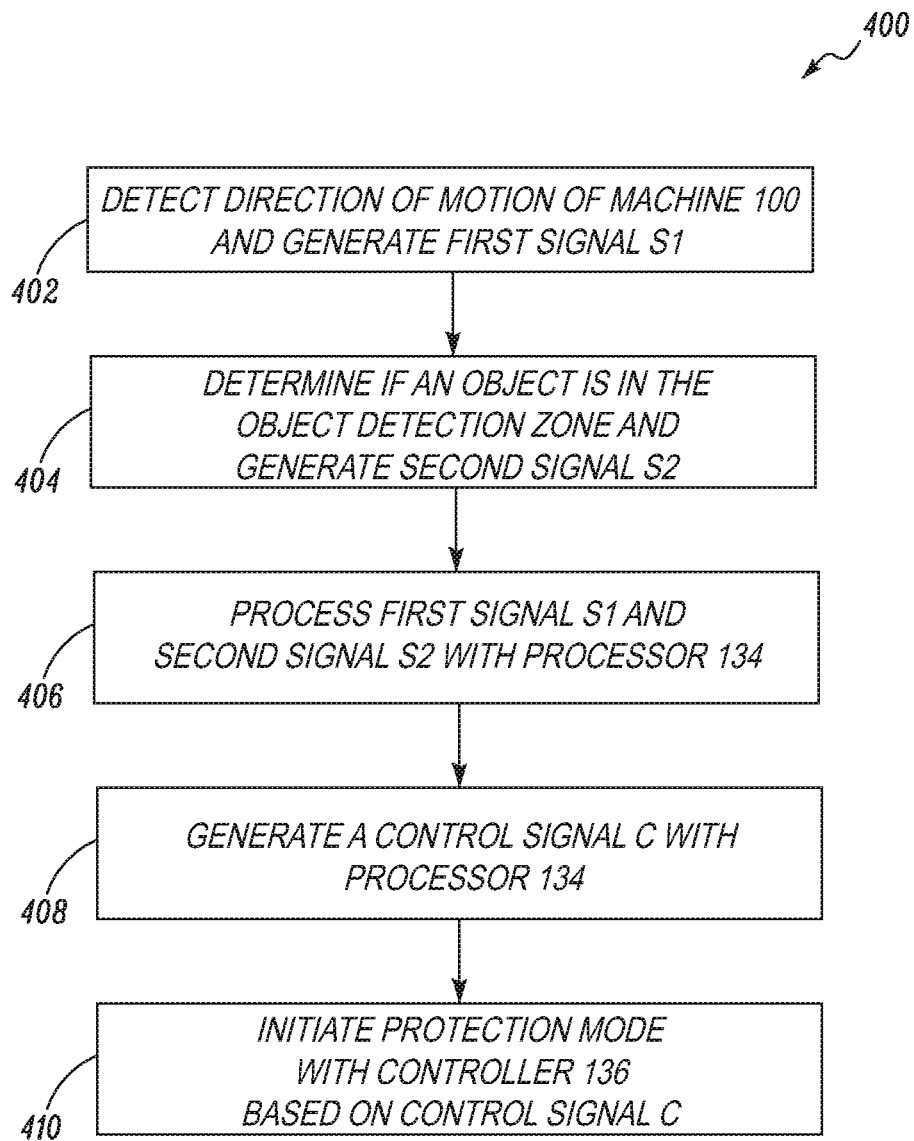
FIG. 4 is a flow diagram illustrating a method of operating the machine in accordance with at least one example.

FIG. 4 shows a method 400 of controlling the rotor 102 or other aspects of the machine 100 of FIGS. 1-3. For ease of description, the method 400 is described with reference to elements shown and described in FIGS. 1-3. However, the method 400 can be used with other machines and other object detection zones, and likewise, the machine 100 can be used with other methods.

At step 402, the first sensor 120 can detect the direction of motion of the machine 100 and generate the first signal S1 based on the direction of motion of the machine 100. At step 404, the second sensor 122 can determine if an object is present in the object detection zone 140 and can generate the second signal S2 based on the presence or absence of an object in the object detection zone 140. In step 406, the processor 134 can process the first signal S1 and the second signal S2 and generate a control signal C. At step 408, the controller 136 can control the rotor 102 based on the control signal C.

In an example, the control signal C triggers the controller 136 to initiate a rotor collision avoidance mode, such as disengaging the rotor 102 from the power source 106, when the first signal S1 is indicative of a reverse direction of motion R of the machine 100 and the second signal S2 is indicative of the presence or absence of an object in an object detection zone 140. Other rotor collision avoidance modes, including but not limited to those examples described herein, may also be initiated to protect the machine 100 or an object from damage.

In an example, the control module 132 can include a machine-readable medium to perform any of the steps of the method 400. In an example, the term "machine readable medium" can include a single medium or multiple media (e.g., a centralized or distributed database, or associated caches and servers) configured to store one or more instructions. The processor 134 can execute the instructions including process circuitry.

FIGS. 5-9 show other examples of second sensors (e.g., 122) and object detection zones (e.g., 140). Like numerals represent like elements, therefore, elements of the machine 100 described in FIGS. 1-3, will not necessarily be described in further detail in the examples of FIGS. 5, 6A, 6B, 7 and 8.

Figure 5:
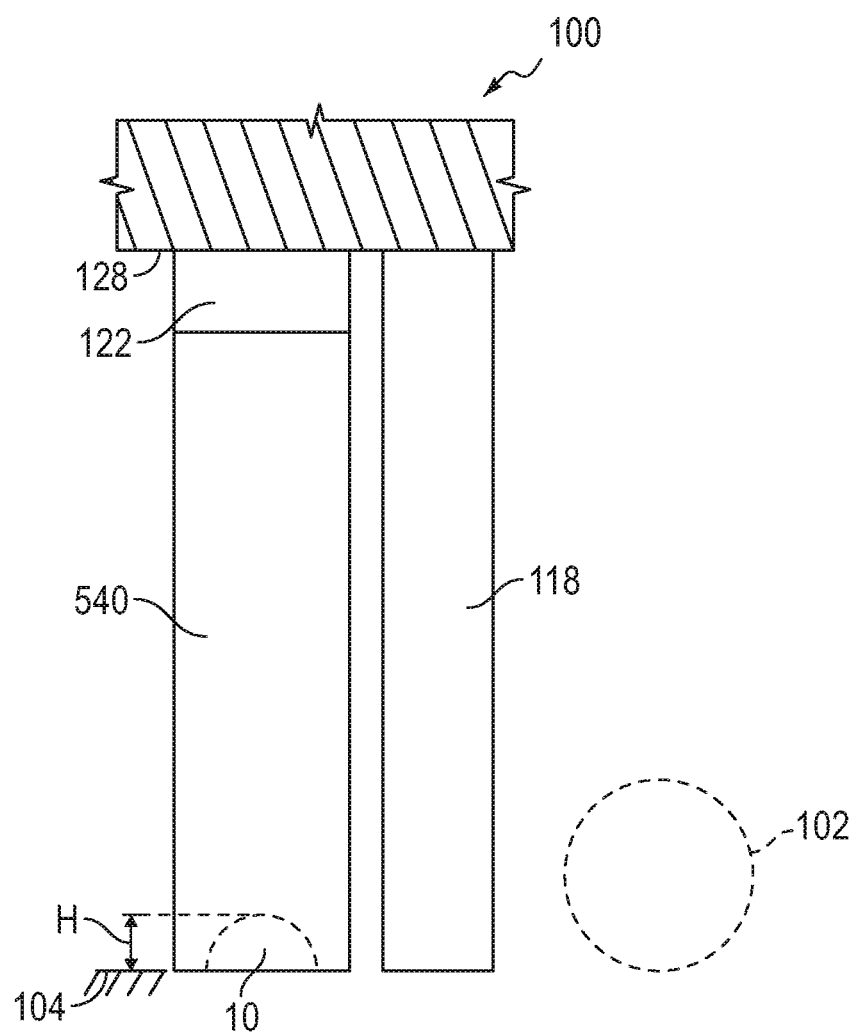
FIG. 5 is a diagram illustrating a top view of an object detection zone and a portion of the machine of FIGS. 1-3, in accordance with at least one example.

FIG. 5 is a diagram of a side view of a portion of the machine 100 of FIG. 1, and an object detection zone 540, in accordance with at least one example.

The portions of machine 100 shown include the frame 128, the second sensor 122, the moldboard 118, and the rotor 102.

The object detection zone 540 can be representative of at least a portion of a volume of space that the rotor 102 (e.g., or another portion of the machine 100) will occupy if the machine 100 travels in a reverse direction a specified distance. The object detection zone 540 can include a three-dimensional zone reward of the milling chamber 112 (shown rearward of the moldboard 118 in FIG. 5). In some examples, and as depicted in FIG. 5, the second sensor 122 can sense objects 10 above a specified height H. The specified height H can correspond to a height that an object 10 may engage a rotor 102 if the machine 100 travels in reverse. The specified height H can represent a location above the ground 104, or a location corresponding to where the ground 104 is expected to be, or within some range above or below the ground 104 or expected location of the ground 104.

Figure 6A:
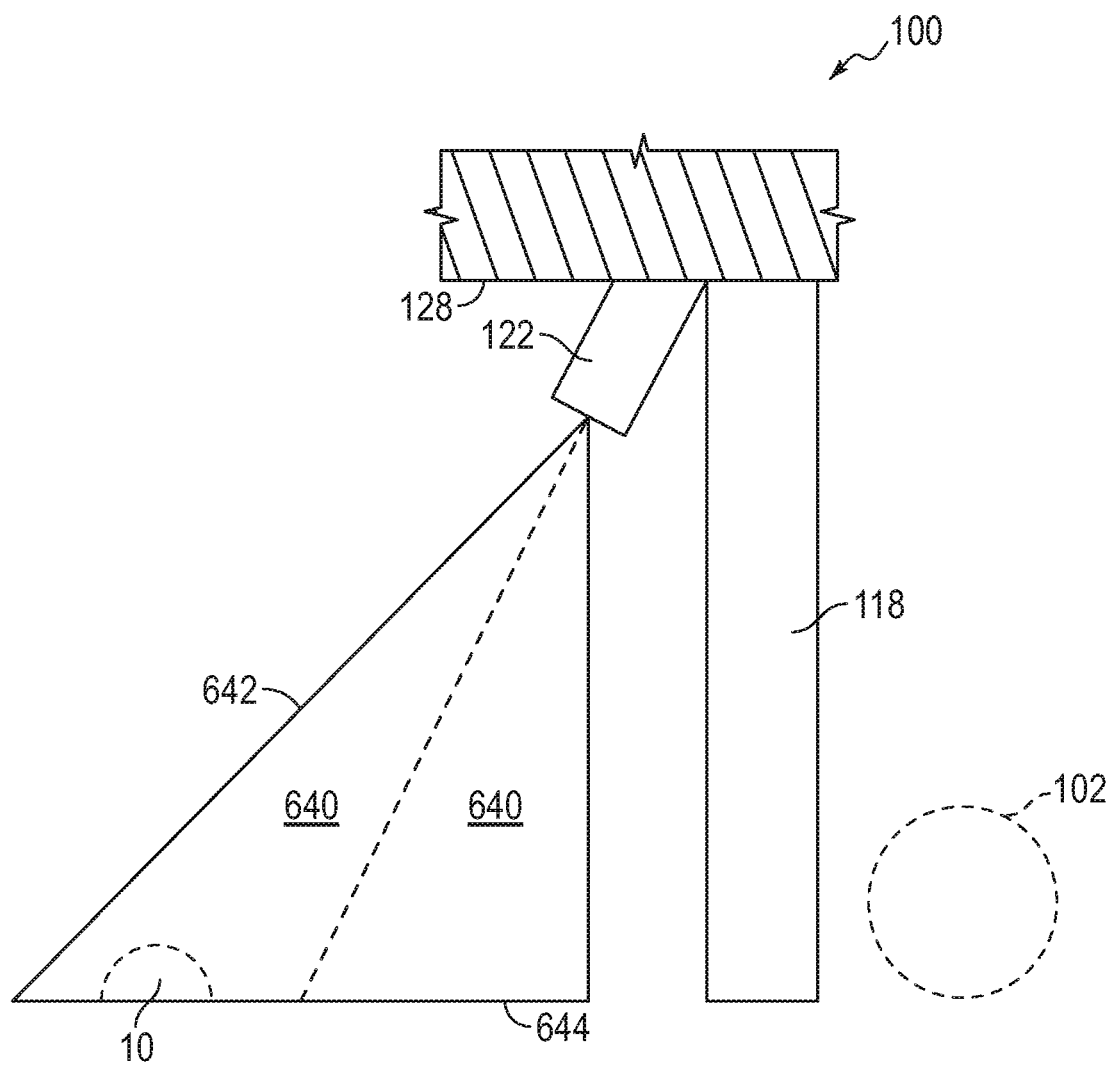
FIG. 6A is a diagram illustrating a side view of another object detection zone and a portion of the machine of FIGS. 1-3, in accordance with at least one example
Figure 6B:
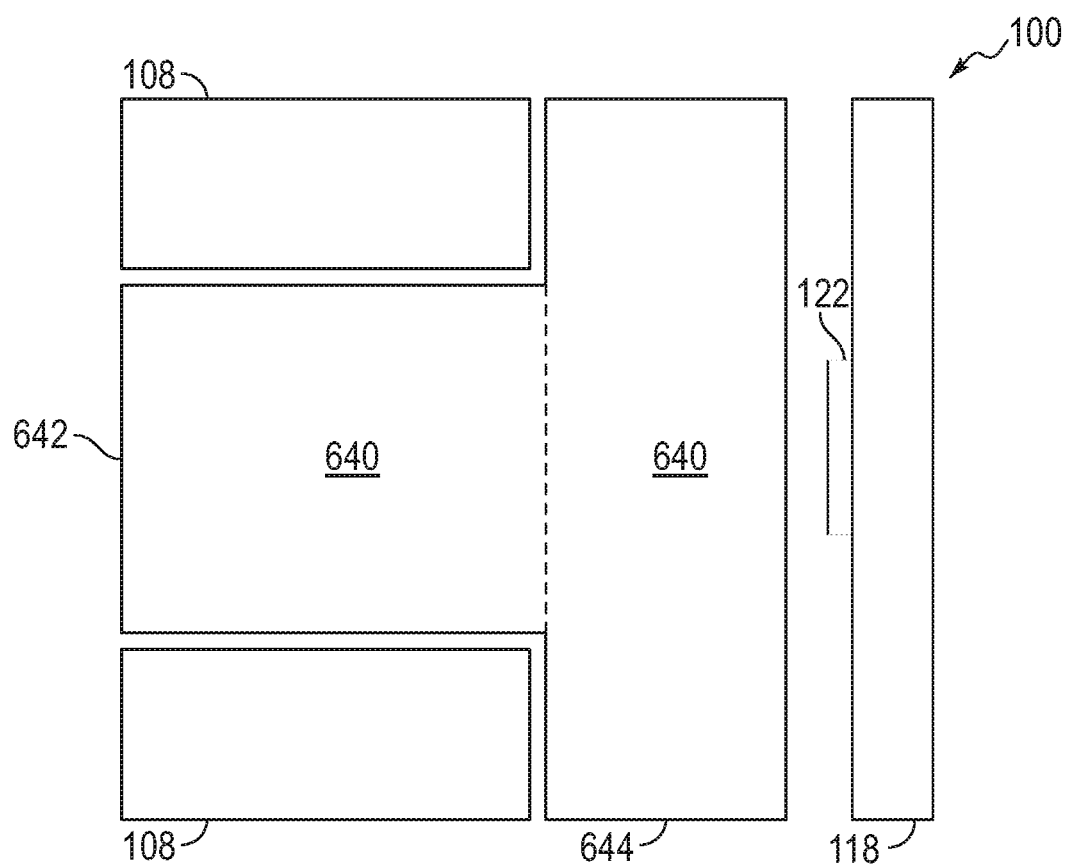
FIG. 6B is a diagram illustrating of a top view of the object detection zone of FIG. 6A and a portion of the machine of FIGS. 1-3, in accordance with at least one example.

FIG. 6A is a diagram of a side view of a portion of the machine 100 of FIG. 1, and another example of an object detection zone 640. FIG. 6B is a diagram of a top view of FIG. 6A along with portions of the machine 100, in accordance with at least one example.

The portions of the machine 100 shown in FIG. 6A include the frame 128, the second sensor 122, the moldboard 118 and the rotor 102.

As shown in FIG. 6A, the object detection zone 640 can include a first object detection zone 642 and a second object detection zone 644. FIGS. 6A and 6B show an example where both the first object detection zone 642 and the second object detection zone 644 can be measured with the same second sensor(s) 622. In some embodiments, instead of a single second sensor 622, the first and second object detection zones 642, 644 can be measured with multiple second sensors 622, including but not limited to, a combination different types of second sensors 622, such as, but not limited to, those described herein.

The portions of the machine 100 shown in FIG. 6B include the moldboard 118, the second sensor 122 and the traveling system 108. In some examples, the first object detection zone 642 can be a warning zone, while the second object detection zone 644 can be a disengaging zone. In an example, when an object 10 is in the first object detection zone 642 (e.g., warning zone), the controller 136 (FIG. 3) can initiate a first rotor collision avoidance mode. For example, the rotor 102 can be slowed down, the travel speed of the machine 100 can be slowed down, or a first warning can be provided to the operator, or any combination of actions thereof.

In an example, when an object is detected in the second object detection zone 644 (e.g., disengaging zone), the controller 136 (FIG. 3) can initiate a second rotor collision avoidance mode. In some examples, the second rotor collision avoidance mode can take more aggressive action to prevent damage than the first rotor collision avoidance mode. For example, the rotor 102 can be disengaged from the power source 106, or the travel speed of machine 100 or rotor (102, FIG. 1) speed may be stopped, or a second warning signal can be sent to the operator interface 138. Any other suitable action to prevent machine 100 or object damage in the warning and disengagement zones may be employed. The actions listed for the first and second rotor collision avoidance modes are not limited to a particular zone or particular actions, but are merely presented for the sake of example.

In some examples, the control signal C can trigger the controller 136 to send a warning signal to the operator interface 138 (FIG. 3) when the first signal S1 is indicative of a reverse direction of motion R of the machine 100 and the second signal S2 is indicative of the presence or absence of an object 10 in the first object detection zone 642, but no object in the second object detection zone 644 (FIG. 6A).

In some examples, the first and second object detection zones 642, 644 can be implemented as a plurality of gradual, incremental or continuous zones, with a plurality of warnings or alarms of increasing severity. For example, an audible warning with a changing pitch, volume or frequency as the sensed object 10 moves closer to the rotor 102 and therefore has a greater risk of being impacted. Risk can be determined a variety of ways, such as, based on one or more of the size of the object 10, the height of the object 10, the proximity of the object, the speed at which the object is approaching the rotor 102, and the density of the object.

Figure 7:
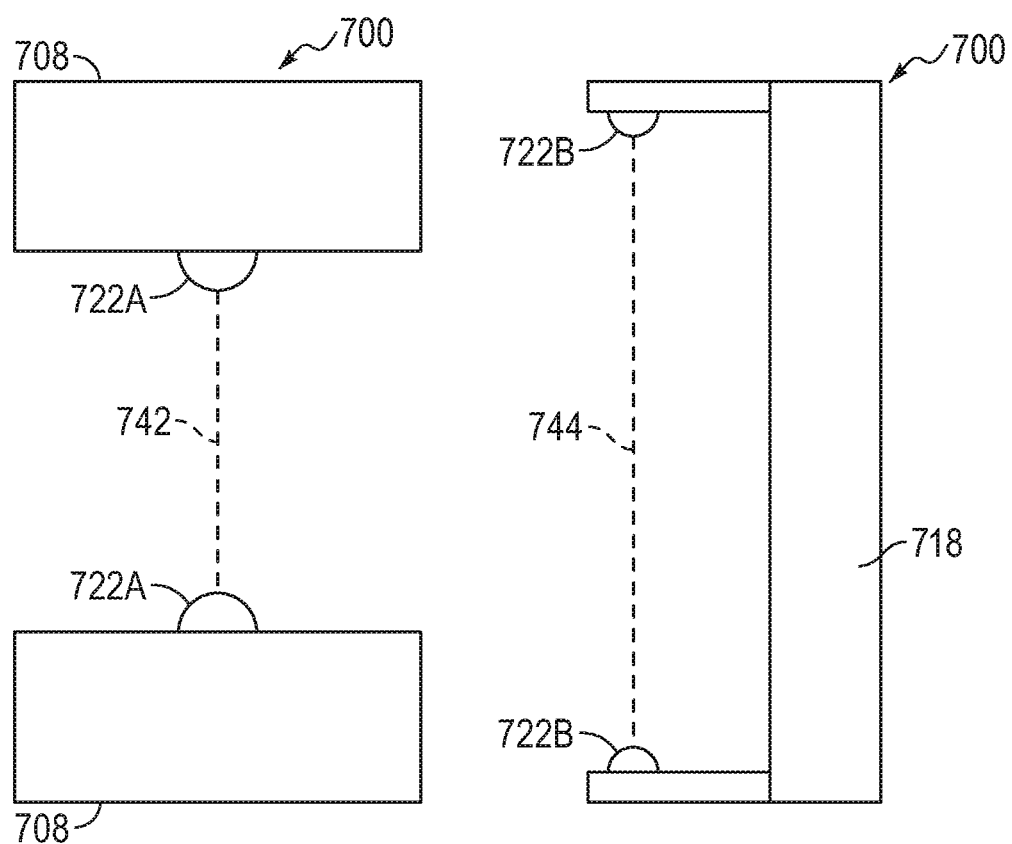
FIG. 7 is a diagram of other second sensors, object detection zones and a portion of a machine similar to the machine of FIGS. 1-3, in accordance with at least one example.

FIG. 7 is a top view diagram of a portion of a machine 700 that is similar to machine 100, and another example of second sensors 722 and object detection zones 742, 744 that can be employed. Portions of machine 700 shown include a moldboard 718 and traveling system 708 which are similar or the same as those described in FIG. 1.

As shown in FIG. 7, a first object detection zone 742 can be sensed by a first object detection zone second sensor 722A, and a second object detection zone 744 can be sensed by a separate second object detection zone second sensor 722B.

In this example, the second sensors 722A and 722B can both be beam-type sensors. That is, using laser, light, radar, or any other suitable energy source, a beam can be sent and received between two portions of the second sensor (722A or 722B). The two portions of the second sensor (722A or 722B) can include, for example, a transmitter and a receiver, or two transceivers. When the beam of energy between the two portions of the first object detection zone second sensor 722A is interrupted by an object, the second sensor 722A can send a signal S2 (FIG. 3) to the controller 136 indicative of the presence of an object in the first object detection zone 742. When the beam of energy between the two portions of the second object detection zone second sensor 722B is broken by an object, the second sensor 722B can send a signal S2 (FIG. 3) to the controller 136 indicative of the presence of an object in the second object detection zone 744.

INDUSTRIAL APPLICABILITY

In general, the foregoing disclosure finds utility in various industrial applications, such as, in earthmoving, construction, industrial, agricultural, mining, transportation, and forestry machines.

As shown in FIGS. 1 and 2, in a mode of operation, while the machine 100 is reversing, there is a possibility that the rotor 102 may encounter an unintended object. To protect the rotor 102 from any undesirable damages due to collision with an unintended object, detection of an object in an object detection zone reflective of a path the rotor 102 is expected to travel, can be used by the processor 134 of the control module 132. In an example, the processor 134 may determine if any object sensed in an object detection zone warrants initiating a rotor collision avoidance mode, such as selectively disengaging or lifting the rotor 102.

The control module 132 shown in FIG. 3, and according to the method 400 of FIG. 4, is used for controlling the rotor 102, the propel system 103, and other aspects of the machine 100. As disclosed in the illustrative examples herein, the control module 132 includes the processor 134 and the controller 136. The processor 134 is configured to receive and process the first signal S1 and the second signal S2 and generate the control signal C. The controller 136 is configured to receive the control signal C from the processor 134 and to initiate a rotor collision avoidance mode, such as selectively disengage the rotor 102 or the propel system 103 based on the control signal C. The control module 132 disclosed herein allows independent control of the rotor 102 and the propel system 103 of the machine 100. The control module 132 follows operation logic of the control signal C that is based on an independent criterion of the first signal S1 and the second signal S2. In an example, when the first signal S1 indicates a reverse direction of motion of the machine 100 and the second signal S2 indicates an object in the object detection zone (140, FIG. 1) that warrants action, the processor processes the first and second signals S1, S2 and prompts the controller 136 with the control signal C to initiate a rotor collision avoidance mode (e.g., disengage the rotor 102 from the power source 106, or initiate another suitable rotor collision avoidance mode, including but not limited to those described herein).

In another example, when the first signal S1 indicates a reverse direction of motion of the machine 100, and the second signal S2 indicates that there is no object in the object detection zone, the controller 136 does not send a control signal C to disengage the rotor 102 from the power source 106, and the rotor collision avoidance mode is not initiated by the control module 132.

In an aspect of the present disclosure, the control module 132 maximizes machine 100 productivity and protects the rotor 102 against damage. During operation of the machine 100, the control module 132 may dynamically receive the first signal S1 and the second signal S2 continuously or at predetermined intervals (e.g., time) and automatically disengage the rotor 102, the propel system 103, or both.

While aspects of the present disclosure have been particularly shown and described with reference to the examples above, it will be understood by those skilled in the art that various other examples may be within departing from the disclosed machines, control modules and methods.

What is claimed is:

1. A machine comprising:
    a machine frame;
    a power source;
    a milling rotor operatively connected to the power source and the machine frame;
    a milling chamber coupled to the machine frame, wherein the milling chamber encloses the milling rotor;
    a first sensor configured to detect a direction of motion of the machine and generate a first signal;
    a second sensor configured to determine if an object is within an object detection zone, and to generate a second signal, wherein the object detection zone is located outside of the milling chamber;
    a control module including:
        a processor configured to receive the first signal and the second signal, wherein the processor generates a control signal based on the first signal and second signals when the milling rotor is rotating but the machine is in a non-milling mode; and
        a controller configured to receive the control signal from the processor when the milling rotor is rotating and the machine is in the non-milling mode and to control operation of the machine according to a rotor collision avoidance mode, based on the control signal.

2. The machine of claim 1, wherein in the rotor collision avoidance mode the controller initiates at least one of: selectively disengage the milling rotor, slow a speed of the milling rotor, stop a propel system of the machine, slow down the propel system of the machine, raise at least a portion of the machine, provide an alert, and provide an alarm.

3. The machine of claim 1, wherein the object detection zone includes a region rearward of the milling chamber, wherein the object detection zone is representative of at least a portion of a volume of space the milling rotor will occupy if the machine travels in a reverse direction a specified distance.

4. The machine of claim 1, wherein the second sensor senses objects above a specified height, wherein the specified height is a height that an object may engage the milling rotor, and further wherein when an object above the specified height is sensed, the second sensor generates and sends the second signal to the controller indicative of a presence of an object in the object detection zone.

5. The machine of claim 1, wherein the object detection zone includes a 2-dimensional zone rearward of the milling chamber.

6. The machine of claim 1, wherein the object detection zone includes a 3-dimensional zone rearward of the milling chamber.

7. The machine of claim 1, wherein the second sensor includes a beam-type sensor comprising a transmitter that produces a beam and a receiver that receives the beam, and wherein when the beam is interrupted, the second sensor generates the second signal, wherein the second signal is indicative of a presence of an object in the object detection zone.

8. The machine of claim 1, wherein the control signal causes the controller to initiate the rotor collision avoidance mode when the first signal is indicative of a reverse direction of motion of the machine and the second signal is indicative of an object being present in the object detection zone.

9. A control module for a milling machine, the control module comprising:
    a processor configured to receive:
        a first signal indicative of a direction of motion of the milling machine,
        a second signal indicative of a presence of an object within an object detection zone, wherein the object detection zone is located outside of a milling chamber that encloses a milling rotor,
        wherein the processor generates a control signal based on the first signal and the second signal when the milling rotor is rotating but the milling machine is in a non-milling state; and
    a controller configured to receive the control signal from the processor when the milling rotor is rotating and the milling machine is in the non-milling state and to control operation of the milling machine according to a rotor collision avoidance mode based on the control signal.

10. The control module of claim 9, wherein in the rotor collision avoidance mode the controller initiates at least one of: selectively disengage the milling rotor, slow a speed of the milling rotor, stop a propel system of the machine, slow down the propel system of the machine, raise at least a portion of the machine, provide an alert, and provide an alarm.

11. The control module of claim 9, wherein the second signal is indicative of a presence of an object in the object detection zone above a specified height, wherein the specified height is a height that an object may engage the milling rotor.

12. The control module of claim 9, wherein the control signal causes the controller to disengage the milling rotor from a power source when the first signal is indicative of a reverse direction of motion of the machine and the second signal is indicative of an object being present in the object detection zone.

13. The control module of claim 9, wherein the second signal is indicative of a presence of an object rearward of the milling chamber.

14. The control module of claim 9, wherein the second signal is indicative of a displacement element being displaced by an object in the object detection zone.

15. A method of controlling a milling rotor of a machine, the method comprising:
    detecting, with a first sensor, a direction of motion of the machine;
    generating, with the first sensor, a first signal based on the direction of motion of the machine;
    determining, with a second sensor, if an object is in an object detection zone;
    generating, with the second sensor, a second signal indicative of a presence or absence of an object in the object detection zone; and
    generating, with a processor, a control signal based on the first signal and the second signal when the milling rotor is rotating but the machine is in a non-milling state; and
    initiating a rotor collision avoidance mode, with a controller, based on the control signal.

16. The method of claim 15, wherein initiating the rotor collision avoidance mode includes at least one of: selectively disengaging the milling rotor, slowing a speed of the milling rotor, stopping a propel system of the machine, slowing down the propel system of the machine, raising at least a portion of the machine, providing an alert, and providing an alarm.

17. The method of claim 15, wherein the second signal is indicative of a presence of an object in the object detection zone above a specified height, wherein the specified height is a height that an object may engage the milling rotor.

18. The method of claim 15, wherein the second signal is indicative of a presence or absence of an object rearward of a milling chamber of the machine.

19. The method of claim 15, wherein the second signal is generated by at least one of a smart camera, a laser scanner or a LIDAR system.

20. The method of claim 15, wherein controlling the milling rotor further includes initiating the rotor collision avoidance mode when the first signal is indicative of a reverse direction of motion of the machine and the second signal is indicative of an object being present in the object detection zone.

\* \* \* \* \*